NOISE BLANKER CIRCUIT COMPRISING OPPOSITELY WOUND SECONDARY WINDINGS

Filed March 12, 1964

INVENTOR.
JOHN L. DENNIS
BY Alden D. Redfield
Irwin P. Garfinkle
ATTORNEYS.

United States Patent Office 3,322,968
Patented May 30, 1967

3,322,968
NOISE BLANKER CIRCUIT COMPRISING OPPOSITELY WOUND SECONDARY WINDINGS
John L. Dennis, Lexington, Ky., assignor to Avco Corporation, Cincinnati, Ohio, a corporation of Delaware
Filed Mar. 12, 1964, Ser. No. 351,500
9 Claims. (Cl. 307—88.5)

ABSTRACT OF THE DISCLOSURE

Each of the embodiments of this invention utilizes a transformer for coupling an input signal to a load. The transformer has at least two ppositely wound secondary windings. The signal is ordinarily transferred to the load through one of the secondary windings, the other secondary being normally disconnected. The other secondary winding is connected into the circuit in response to a gating signal, resulting from noise. Because the secondary windings are wound in series opposition, their effective impedance is reduced to zero, thereby short-circuiting the signal from the load in the presence of noise.

This invention relates to signal-blocking circuits generally, and more particularly to a signal-operated impulse noise blanking switch having a coupling element insertable into the circuit for cancelling signals because of a resulting phase shift.

The primary object of this invention is to reduce signal input substantially to zero on command for finite periods of time.

Another object of this invention is to provide an active semiconductor element in combination with a compound transformer for signal blanking by the introduction of out-of-phase signal of essentially equal instantaneous power.

Another object of this invention is to provide a double-base, double-emitter semiconductor in combination with a compound transformer to attenuate the signal by the command-controlled introduction of an out-of-phase signal component.

Briefly described, in one embodiment of the invention, signal is applied to the primary winding of a trifilar wound transformer having two secondary windings. Signal is ordinarily transferred to a load through one of the secondary windings. However, upon the presence of a pulse of sufficient amplitude, the two secondary windings are connected in a series loop, but in 180-degree phase relationship by means of a double-base, double-emitter semiconductor gate, to cancel substantially all of the signal from the load. The amplitude of the pulse must be sufficient to trigger the gate and must be just above the modulation envelope to avoid desired signal clipping. Only the noise spikes are blanked, and the blanking period is controlled to slightly overlap the blocking of the undesired signal.

In a second embodiment of this invention, the transformer is air-cored for use at VHF and it includes two primary windings and two secondary windings. It might comprise two separate transformers. During normal operation, signal transfer is accomplished directly from the source to the load, the first primary and secondary serving as high impedance shunts. On command from a control pulse, a semiconductor gates the first primary and the first secondary into parallel connection across the source, but in phase opposition, thereby inducing opposing currents into the windings and reducing the effective shunt impedance towards zero, and simultaneously gates the second primary and secondary windings into parallel connection, but in phase opposition, thereby inducing opposing out-of-phase currents and similarly reducing the effective shunt impedance towards zero, thus eliminating the signal from the load.

A third embodiment of the invention utilizes two iron-cored trifilar wound transformers which operate in a manner similar to that of the second embodiment. However, an additional inductive coupling link is employed to reduce the internal capacitance coupling effects from the first transformer to the second.

For a better understanding and further objects of the invention, reference should now be made to the following detailed specification and to the accompanying drawing in which.

Figures 1, 3, 4, 5:
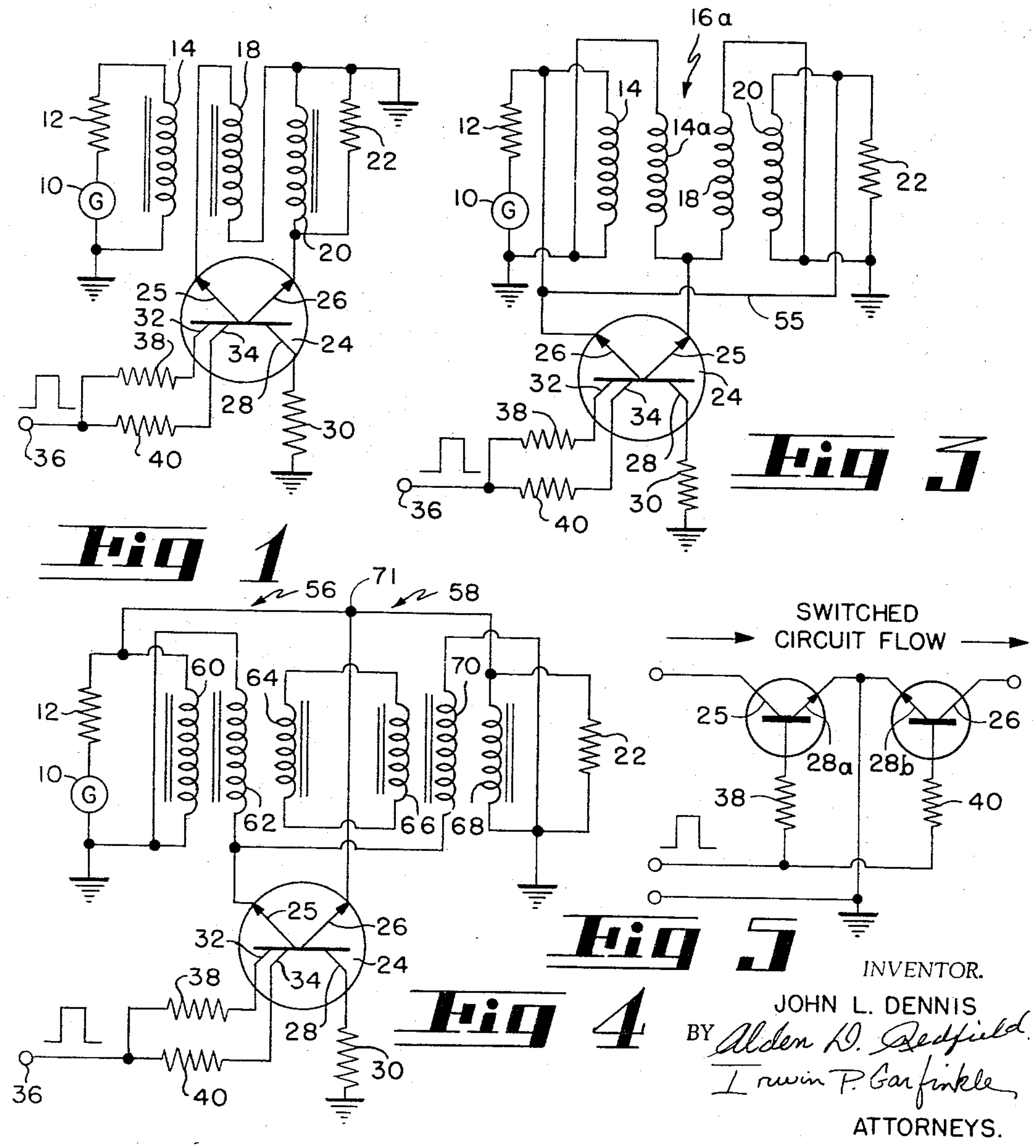
FIGURE 1 represents a simple, practical embodiment of this invention.
FIGURES 3 and 4 represent modifications of the invention.
FIGURE 5 is an equivalent circuit showing the relationship of the elements within the semiconductor.

Referring to FIGURE 1, the invention includes a signal generator 10, representing, for example, the output of a receiver amplifier, and having an impedance characteristic represented by a resistor 12 feeding the primary winding 14 of a trifilar wound transformer 16 having two secondary windings 18 and 20, all wound on a common core. In the trifilar wound transformer, three conductors are wound adjacent, i.e., ribbon style, on a core. The middle conductor usually is made the primary winding for uniform coupling to each of the other windings. The windings may be spaced for inter-element and distributed capacity considerations, but the inductive coupling should be maintained as near the ideal 100% as is practical. In the particular application, a powdered iron core was satisfactory for the high frequency and lower VHF spectrum. The transformer 16 may be air-cored for higher frequency operation.

A load represented by resistor 22 is connected across the secondary winding 20. The winding 18 is cross-connected in series with the winding 20 in such manner that the voltages induced in the two windings from the primary winding 14 tend to cancel when the cross-connection is completed through a normally non-conducting open gate comprising a semiconductor 24.

In the operation of the circuit as thus far described, the entire signal transfer from the generator 10 to the load 22 is accomplished through the secondary winding 20. However, when it is desired to cancel or blank the signal to the load for a period of time, the semiconductor 24, essentially two paralleled transistors, commonly referred to as an integrated chopper, connects the two windings 18 and 20 in a loop. In effect, the two windings 18 and 20 constitute out-of-phase generators driving into the load with equal voltages. So driven, essentially no net voltage exists across the load 22. With the semiconductor 24 non-conducting or in a high impedance state, the winding 18 amounts to a generator which is disconnected, or "floating." Then the load is driven only by the signal source emanating from the winding 20, and normal two-winding transformer action is realized when the gate semiconductor 24 is open. When the gate is closed, the winding 18 is connected across the load and there is, in effect, signal subtraction in the load between the two generators (represented by the windings 18 and 20) at selected times.

The semiconductor 24 comprises a first element 25 connected to the end of the secondary winding 18, a second element 26 connected to the end of the primary winding 20, a common element 28 connected to ground through a low impedance stabilizing resistor 30, and first and second bases 32 and 34 connected to a pulse input terminal 36 through stabilizing or isolation resistors 38 and 40, respectively. The semiconductor 24 may be of the type INCH 2356. The equivalent transistor circuit is shown in FIGURE 5 with similar reference characters denoting the equivalent structure, the element 28 being represented by the elements 28*a* and 28*b*. The semiconductor 24 is signal powered, i.e., the emitter-collector junctions are each powered solely by the signal developed across the windings 18 and 20. It is gated by controlled driving of the two bases for the desired signal blanking period. The circuit assumes the availability of a control voltage. In the application as reduced to practice, a pulse having a controlled time width equal to the desired blanking period for simultaneously driving the two bases 32 and 34 of the semiconductor was used.

With no drive on the semiconductor 24, it appears to be cut off such that it exhibits a very high impedance between the junctions of its two elements 25 and 26. In this state the transformer functions as a signal coupler between the generator 10 and the load 22, the primary winding 14 and the secondary winding 20 serving as the effective transfer elements. The transfer characteristics and insertion losses are typical of any good two-winding transformer. When a control voltage of sufficient magnitude to start current flow in the transistor is applied to each of the bases 32 and 34 of the semiconductor 24, the effective impedance between the junction of elements 25 and 26 falls towards zero and starts signal cancellation. At saturation, the two secondary windings 18 and 20 are fully connected in series-bucking relationship. Since the generated voltages should be equal by reason of the transformer construction, the load 22 is driven with near equal currents phased about 180 degrees apart. Actually, the phase may be slightly off 180 degrees by reason of distributed capacitance and leakage inductance, but cancellation in the load will be sufficient for practical purposes. Attenuation in the order of 40 db is obtainable with the relatively simple design of FIGURE 1 and is adequate for most applications. Higher attenuation is achieved with more efficient transformer design of the types illustrated in FIGURES 3 and 4, hereinafter to be described.

Figure 2:
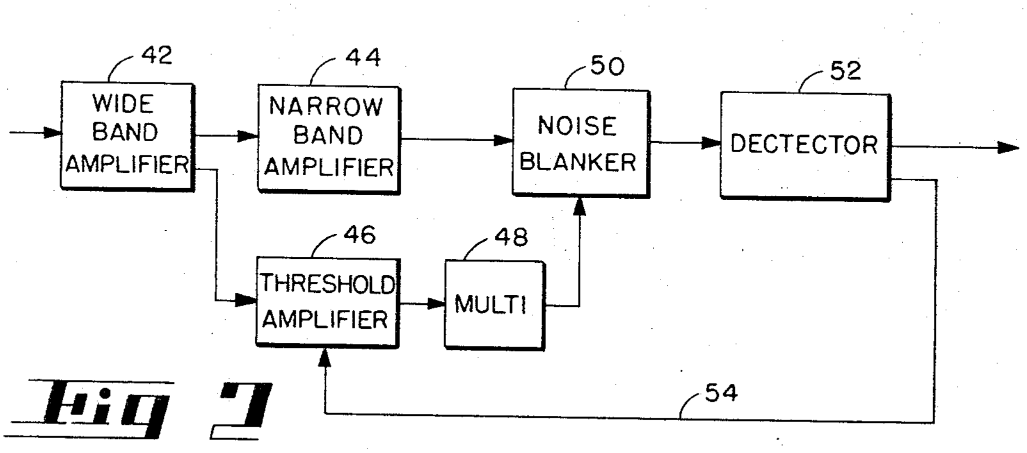
FIGURE 2 illustrates in block diagram form a typical system in which the invention may be incorporated.

The invention finds utility in the exemplary system illustrated in the block diagram of FIGURE 2. It shows a portion of a receiver including a wideband amplifier 42, to which signal along with noise content is applied. The output of the wideband amplifier 42 is fed simultaneously into a narrow-band amplifier 44 and into a threshold circuit 46. The threshold circuit is set to recognize signals above a predetermined level, and that leevl is made a function of the signal modultion envelope such that the threshold is maintained just above the modulation. Thus, noise spikes are accepted by the threshold amplifier and fed to a multivibrator 48 which serves as the drive for the noise blanker circuit 50. The noise blanker is activated by the output pulse from the multivibrator 48 in time to block passage of the signal from the narrow-band amplifier 44. This short blanking period is a function of the square wave width which in turn is a function of the time during which the noise spikes exceed the established threshold level. Ordinarily the blanked signal is not missed in the signal intelligence, and the noise spikes are separated and squelched ahead of the detector 52. As is usual in the prior art, the threshold level is gain controlled by the AGC voltage available from the detector at lead 54. While the multivibrator 48 is used in this embodiment to provide a uniform amplitude control pulse with variable width, the control signal may be derived from the impulse noise spike and be proportional in amplitude thereto. In that case, the larger the impulse, the more complete would be the corresponding signal cancellation at the noise blanker 50.

The circuits illustrated in FIGURES 3 and 4 are similar to that of FIGURE 1, the same reference characters indicating the same parts, but differ somewhat in operation. In FIGURE 3 the transformer 16 is replaced by an air-cored transformer 16*a* having primary winding 14 and the two secondary windings 18 and 20, and in addition is provided with a second primary winding 14*a*. The generator 10 is normally coupled directly to the load through lead 55, with the windings 14 and 20 providing a high impedance shunt across both the generator and the load. Since the collector junctions of the semiconductor 24 present a very high impedance to both the windings 14*a* and 18, essentially no current flows through these windings, and these windings are "floating." However, when a pulse is applied to the terminal 36, the impedance of the semiconductor 24 is reduced towards zero, and hence the winding 14*a* is connected in parallel relationship, but in phase opposition with respect to the primary winding 14 across the generator 10, and the winding 18 is connected in parallel relationship, but in phase opposition with respect to the secondary winding 20 across the load 22. Since the currents induced in the respective pairs of windings are in opposition, there is current cancellation in the windings, and the effective shunt impedance across both the generator 10 and the load 22 is reduced towards zero, thereby cancelling the output from the source and the input into the load.

In the embodiment of FIGURE 4, two trifilar iron-cored coupled transformers 56 and 58 are used in lieu of the single transformer of FIGURE 3. In this case the transformer 56 includes windings 60, 62, and 64, and the transformer 58 includes windings 66, 68, and 70. The generator is coupled directly to the load through a lead 71. The windings 60 and 68 are connected directly across the generator 10 and the load 22, respectively, and provide a high impedance shunt therefor. The winding 64 of transformer 56 is connected directly to the winding 66 of transformer 58 but the currents induced therein from the windings 60 and 68, respectively, are in opposition, and therefore essentially no current flows in that loop and it constitutes an essentially open circuit.

The windings 62 and 70 are "floating," since their connection into the circuit is through the normally open circuit provided by the semiconductor 24. However, when the semiconductor 24 is rendered conductive by the application of a pulse to terminal 36, the winding 62 is connected across the winding 60 in such a direction that the currents in the loop are in phase opposition and, similarly, the winding 70 is connected across the winding 68 so that the currents flowing in that loop are in phase opposition. Since these windings constitute shunt impedances across the generator 10 and the load 22, respectively, and since the current-flow through the winding tends to generate flux in opposition, the effective impedance of the shunts is reduced towards zero and there is effective cancellation of the signal both at the generator 10 and at the load 22.

From the foregoing it will be apparent that the invention is susceptible to many variations and adaptations. It is intended, therefore, that the invention be limited only by the scope of the appended claims as interpreted in the light of the prior art.

What is claimed is:

1. A signal blanking circuit comprising:

a source of signal;

a load;

a transformer having a first primary winding connected across said source of signal, a first secondary winding connected across said load, a second secondary winding, and a second primary winding; and controlled gating means for connecting said second secondary winding in phase opposition with said first secondary winding across said load, and for simultaneously connecting said second primary winding in series-bucking relationship with said first primary winding across said source of signal for controlled periods of time.

2. The invention as defined in claim 1 wherein said controlled gating means is the diode junction of a semiconductor; and means for controlling the impedance of said junction.

3. A signal blanking circuit comprising:

a source of signal;

a load;

a first transformer having a primary winding connected across said source of signal, a first secondary winding connected across said load, and a second secondary winding;

controlled gating mean for connecting said second secondary winding in phase opposition with said first secondary winding across said load for controlled periods of time;

a signal generator; and a second transformer having at least one primary winding and a secondary winding, said one primary winding being connected across said signal generator, and the signal developed across said secondary winding of said second transformer constituting said source of signal.

4. The invention as defined in claim 3 wherein said second transformer includes a second primary winding, said controlled gating means simultaneously connecting said first and second primary windings in phase opposition across said signal generator.

5. The invention as defined in claim 4 wherein said controlled gating means is the diode junction of a semiconductor; and means for controlling the impedance of said junction.

6. A signal blanking circuit comprising:

a source of alternating current signal;

means for producing from said source first and second alternating voltage signal sources, said means comprising a transformer having a primary winding connected across said source of alternating current signal and first and second secondary windings, said load being connected across said first secondary winding, the voltages developed across said first secondary winding constituting said first alternating voltage signal source, and the voltages developed across said second secondary winding constituting said second alternating voltage signal source;

a load connected across the first of said alternating voltage signal sources;

gate means operable at selected times for series connecting said first and second alternating voltage signal sources in phase opposition, said second alternating voltage signal source being disconnected at other times, said gate means comprising a normally nonconducting semiconductor having first and second emitter-collector electrodes connected across said first and second alternating voltage signal sources, respectively; and means for rendering said semiconductor conductive.

7. A signal blanking circuit comprising:

a source of signal;

a load connected across said source;

a first high impedance inductor connected across said load;

a second substantially identical inductor inductively coupled to said first inductor;

a gate; and means at controlled periods of time for connecting said second inductor through said gate in phase opposition with said first inductor, whereby the effective impedance of said inductors is reduced towards zero to shunt said source from said load.

8. The invention as defined in claim 7, and a third high impedance inductor connected across said source, and a fourth substantially identical inductor inductively coupled to said third inductor, said means simultaneously connecting said fourth inductor through said gate in phase opposition with said third inductor, whereby the effective impedance of said inductors is reduced towards zero to further shunt said source from said load.

9. A signal blanking circuit comprising:

a source of signal;

a load connected across said source;

a first transformer having a primary winding connected across said source, a second primary winding and a secondary winding;

a second transformer having a primary winding connected across said secondary winding, a first secondary winding and a second secondary winding connected across said load; and controlled gating means for connecting said second primary winding of said first transformer in phase opposition with said first primary winding of said first transformer and for simultaneously connecting said first secondary winding of said second transformer in phase opposition with said second secondary winding of said second transformer, whereby the effective impedance across said load and said source is reduced towards zero to shunt said signal from said source.

References Cited

UNITED STATES PATENTS 3,184,675 5/1963 Macklem ------------ 323—50

ARTHUR GAUSS, *Primary Examiner.*

R. H. EPSTEIN, *Assistant Examiner.*

UNITED STATES PATENT OFFICE
CERTIFICATE OF CORRECTION

Patent No. 3,322,968 May 30, 1967

John L. Dennis

It is hereby certified that error appears in the above numbered patent requiring correction and that the said Letters Patent should read as corrected below.

Column 1, line 14, for "ppositely" read -- oppositely --; line 62, before "secondary" insert -- second --; column 3, line 47, for "leevl" read -- level --; column 5, line 9, for "mean" read -- means --.

Signed and sealed this 2nd day of January 1968.

(SEAL)
Attest:

Edward M. Fletcher, Jr.
Attesting Officer

EDWARD J. BRENNER
Commissioner of Patents